United States Patent [19]
Edelblute et al.

[11] Patent Number: 4,754,282
[45] Date of Patent: Jun. 28, 1988

[54] IMPROVED DATA ANALYSIS SYSTEM

[75] Inventors: David J. Edelblute; Gerald L. Kinnison, both of San Diego, Calif.

[73] Assignee: The United States of America as represented by the Secretary of the Navy, Washington, D.C.

[21] Appl. No.: 25,597

[22] Filed: Mar. 25, 1970

[51] Int. Cl.$^4$ ............................. G01S 5/02; G01S 9/68
[52] U.S. Cl. ..................................... 342/417; 342/378; 367/100
[58] Field of Search ......................... 343/113, 100 CL; 235/181; 340/16 P; 342/417, 378; 367/100

[56] References Cited

U.S. PATENT DOCUMENTS 3,130,408  4/1964  Kumano ............................. 343/113
3,359,409  12/1967  Dryden .................... 343/100 CL X Primary Examiner—Theodore M. Blum
Assistant Examiner—Tod Swann
Attorney, Agent, or Firm—R. S. Sciascia; G. J. Rubens; J. W. McLaren

[57] ABSTRACT

A data analysis system accepts time related data samples which are developed from sets of common wavefronts incident upon a plurality of sensors. The data samples are converted from analog-to-digital form and the Fourier transforms relative to the frequency components are generated. The frequency components of the Fourier transforms are in turn cross-correlated for developing matrices of all possible correlations for each frequency component and then the matrices are integrated over a determinable time period. The resultant integrated matrices are compared with signals representative of an incident plane wave power as a function of its angles of arrival at a sensor array and of its frequency, producing output signals of relative strength indicative of the direction of the origin of the data samples.

9 Claims, 5 Drawing Sheets

IMPROVED DATA ANALYSIS SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The problem sought to be solved by the present invention is one which arises out of a plane wavefront being intercepted by an array of sensors producing sensor outputs which are time related as a function of the angle at which the wavefront arrives at each sensor and as a function of frequency. The resultant difficulty is essentially that of detecting the direction of the origin of the wavefront in the presence of noise or other unwanted interference. The sensors may be acoustic such as hydrophones employed in a sonar system for the detection of underwater targets, radar antennae, or any comparable sensor array which produces time related outputs containing directional information in terms of phase and frequency. The outputs of a set of N sensors may be recorded as time functions $X_{i(t)}$, where $i = 1, 2, 3, \ldots, N$. It is desired to draw inferences about the environment of the array from the N time sequences. It is presumed that the $X_{i(t)}$ may be coordinated in some manner to produce environmental information.

This problem has usually been approached by applying linear transformations to the $X_i$'s, summing the results, and then squaring and time averaging the result. The linear transformations are chosen to correspond to a far field source of signal in a particular direction. As an example, the linear transformations may be assumed to be represented as convolutions of the $X_i$'s with a set of $H_i$'s, the summed output is then $$\sum_{i=1}^{N} \int_{-\infty}^{\infty} x_i(t - T) v_i(T) dT \quad (1)$$

When this output is squared and integrated the result becomes $$\int_{-T}^{T} \sum_{i=1}^{N} \sum_{j=1}^{N} \left( \int_{-\infty}^{\infty} x_i(t - T) v_i(t) dT \right) \left( \int_{-\infty}^{\infty} x_j(t - T) v_j(T) dT \right) \quad (2)$$

This expression can be simplified by letting $x(f)$ and $v(f)$ denote the Fourier transforms of $x(t)$ and $v(T)$, respectively, the output is therefore by parseval's theorem, $$\int_{-\infty}^{\infty} \sum_{i=1}^{N} \sum_{j=1}^{N} x_i^*(f) v_i^*(f) x_j(f) h_j(f) df \quad (3)$$

If $V^T(f) = [v_1(f) \cdots v_N(f)]$ and $X^T(f) = [x_1(f) \cdots x_N(f)]$ then this expression may be written as $$\int_{-\infty}^{\infty} V^H(f) X^*(f) X^T(f) V(f) df \quad (4)$$

If a large number of these time samples of output power are averaged:

$$\left\langle \int_{-\infty}^{\infty} V^H(f) X^*(f) X^T(f) V(f) df \right\rangle = \quad (5)$$

$$\int_{-\infty}^{\infty} V^H(f) \langle X^*(f) X^T(f) \rangle V(f) df = \int_{-\infty}^{\infty} V^H(f) C(f) V(f) df$$

Where $C(f) = \langle -X^*(f) X^T(f) \rangle$ it should be noted that C is an $N \times N$ positive definite matrix.

This integrand may be considered one frequency at a time. The function of interest then is a function of $\phi$ which is representative of the angles describing the direction of interest in terms of azimuth and elevation, and the noise covariance, C. The V contains the dependence on $\phi$. Specifically, the linear operators used are usually time delays chosen so that noise from a far field signal source will add coherently at the summation point. The v's are $v_{i(t)} = \delta(T - T_i)$ and $v_i(f) = \exp(\sqrt{-1} 2\pi f T_i)$, where $T_i$ is the travel time to the $i^{th}$ sensor from some surface of equal phase of the wavefront of interest. Therefore, at a frequency of interest, the function may be expressed as, $p(\phi, C) = V^H(\phi) C V(\phi)$.

This function will generally be large if there is considerable noise coming from the ($\phi$) direction and will generally be significantly smaller if there is considerably lesser noise coming from that direction. From it it is possible to derive a fairly accurate indication of the acoustic environment involved, however, in principle it cannot be claimed to be optimal.

Most optimum processing for sensor arrays is formulated for the detection and/or recovery of significant signal information from one specific direction ($\phi$) in the presence of ambient noise. The solutions generally require noise covariance matrix, $C_o$, to be measured at a time when the one specific signal of interest is known either to be present or to be absent. Any fault or error in identification of the circumstances under which $C_o$ is determined, may lead to subtle and not readily identifiable problems which are nonetheless very serious. Typically, a prior knowledge of $C_o$ is not possible. In the face of this state of facts, the effort must still be made to derive significant and reliable information from the observed C, because usually odd order moments are either absent or have no physical significance, and moments of higher order than two are prohibitively difficult to obtain because of the limitation in instrumentation to reliably develop information relative to the second order moments of interest. The problem is aggrevated considerably by the absence of a good and reliable criterion for determining if any other function $q(\phi, C)$ is better or worse than $p(\phi, C)$.

Accordingly, it is highly desirable that the criteria, methods, and equipment for data analysis currently in use be improved upon to provide more reliable and significant information as to the direction, i.e., elevation and azimuth origin of a wavefront which impinges upon a multi-sensor array so as to produce time related signals in terms of phase and frequency.

SUMMARY OF THE INVENTION

Applicants have discovered that if instead of carefully determining the noise covariance matrix in the absence of a signal in implementing a process such as that described by F. Bryn, the measured noise covariance matrix obtained during time of actual operation may be employed to arrive at filter transfer functions and such a function may be expressed $$q(\phi,C) = \frac{1}{V^H(\phi)C^{-1}V(\phi)} \qquad (7)$$

$$r = (\phi,C) = \frac{V^H(\phi)C^{-1}V(\phi)}{V^H(\phi)C^{-2}V(\phi)}$$

It should be noted that the above function $q(\phi,C)$ is the reciprocal of that function which would be obtained if a process of the type described by F. Bryn were conventionally employed.

A second and different function $r(\phi,C)$ may be obtained if the same noise covariance matrix were employed in the above described manner but the system was constrained such that if $u_i(f)$ is the transfer function of the $i^{th}$ filter, and $$\sum_{i=1}^{N} |u_i(f)|^2 \qquad (8)$$

is a constant for all $\phi$ directions.

In accordance with the concept of the present invention, the received data samples are converted from analog-to-digital form and the Fourier transforms relative to the frequency components of the data samples in digital form are developed therefrom. Each frequency component of the Fourier transform corresponding to each data sample is cross-correlated with each like frequency component of the Fourier transform of each other data sample for developing matrices of all such correlations for each frequency component. The cross-correlation matrices for each frequency component are then integrated over a determinable time period for producing multiple pluralities of integrated output signals, each plurality representing the signals developed at a particular frequency.

Means are provided for storing multiple pluralities of synthesized signals, each plurality being representative of incident plane wave power as a function of its angle of arrival at a plurality of sensors and of its frequency. A comparator means compares the pluralities of integrated output signals with the pluralities of synthesized signals for producing output signals of relative strength indicative of the direction of the origin of the data sample relative to the directional disposition of the sensors which originally developed the data. This latter comparator effectively operates as a filter of variable character dependent upon the integrated cross-correlation matrices which it receives as input signals. Such integrated cross-correlation matrices may, as will be apparent to those knowledgeable and skilled in the art, be continuously changing in response to new input data or responsive to different selectable integration time periods; thus, the filtering functions performed by the comparator are broadly flexible in an operative sense.

In one alternative concept for achieving substantially the same results during the available observation time, outputs from all the sensors may be developed and recorded, together with the relative phase, filters may be chosen from many different directions, either from the data (adaptively) or from a priori information. Then the data can be recirculated through the filtering operation and power outputs developed corresponding to each direction. For those directions which seem more promising and interesting in an informational sense, further filtering operations can be performed for finer directional resolution and the recorded data can be recirculated again through the finer filtering processes. These processes may be repeated as many times as desired to achieve the desired directional resolution. However the implementation of this approach would severely strain the capabilities of the present state of the art in the sense of recording and playback capacities.

STATEMENT OF THE OBJECTS OF THE INVENTION

Accordingly, it is a primary object of the present invention to provide a significantly improved data analysis system for determining directional information from data developed in sensors responsive to produce time-related data samples from a common wavefront.

A further most important object of the present invention is to provide such a data analysis system which does not require a priori noise information for its operation.

Yet another most important object of the present invention is to provide such a data analysis system which operates to develop its own noise criteria during actual operation for the detection of directional information in received data.

A further object of the present invention is to provide such a data analysis system which may be employed to effect adaptive beam-forming techniques in the processing of received data samples for the detection of the direction of origin of data information.

A further object of the present invention is to provide a data analysis system which is adaptable to recirculating the data developed for comparison and filtering purposes to achieve a finer resolution in the detection of the direction of origin of information contained within received data samples.

These and other features, objects, and advantages of the present invention will be better appreciated from an understanding of the operative principle of a preferred embodiment as described hereinafter and as illustrated in the accompanying drawings.

DESCRIPTION OF THE PREFERRED EMBODIMENTS

Figure 1:
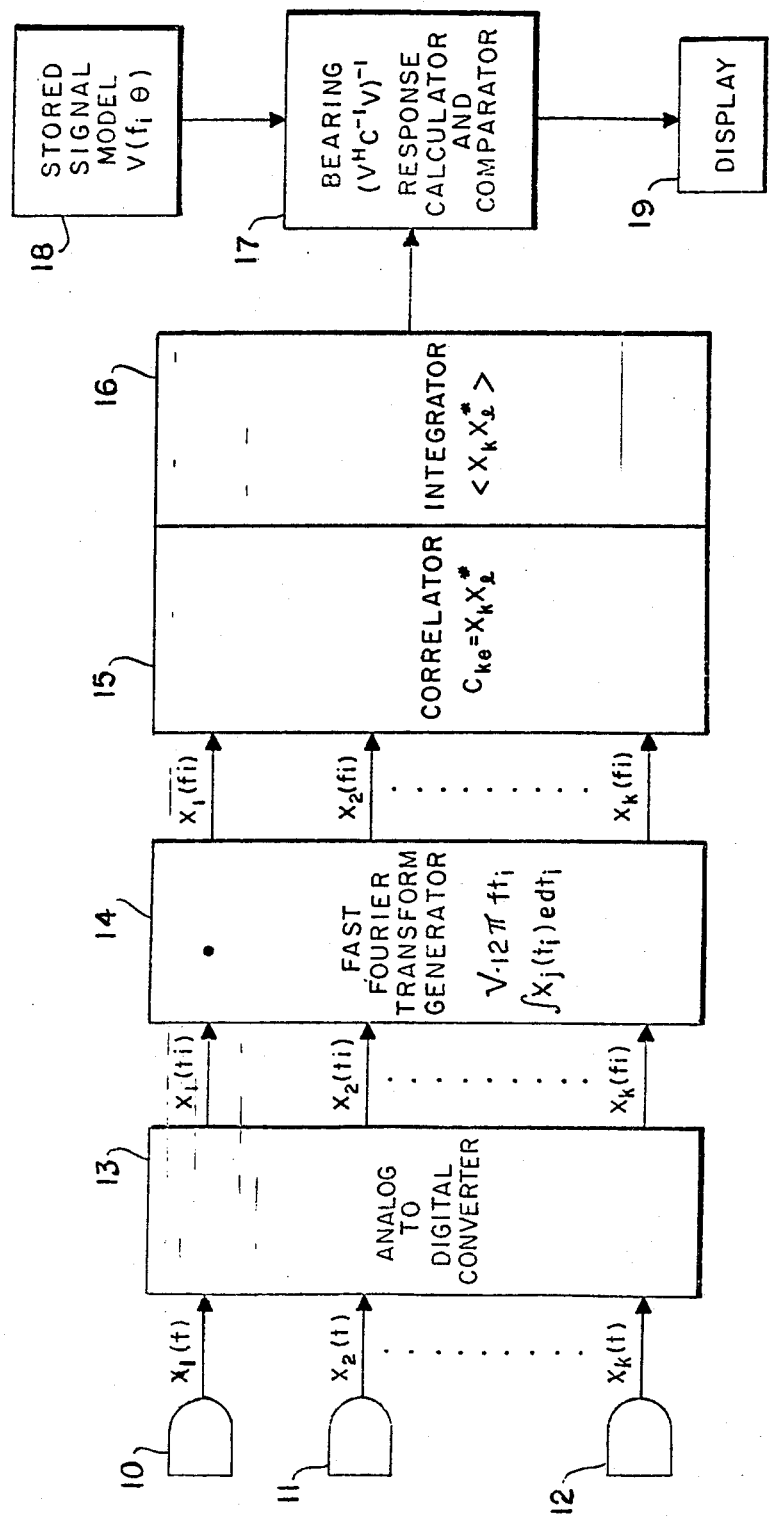
FIG. 1 is a schematic block diagram of a preferred embodiment of the data analysis system of the present invention.

FIG. 1 is a schematic block diagram illustrating one preferred embodiment of the present invention. A multiple array of sensors such as indicated at 10, 11 and 12 are positioned to receive data samples from a common planar wavefront and produce signals as a function of intensity and relative phase. The sensors 10, 11, and 12 may typically be hydrophones in a sonar system, antennae in a radar system, or any other similar type of sensors. The multiple sensors may comprise a beam-forming or steerable array, as is well known in the art.

The data samples developed by the sensors 10, 11 and 12 are connected as an input to an analog-to-digital converter 13 where the data samples are converted to a digital form. The analog-to-digital converter is a multiplexer, analog-to-digital converter which generates a timing pulse every $\Delta t$ seconds. When the timing pulse is received in the multiplexer, the amplitude of the voltage from each sensor such as indicated at 10, 11 and 12 is simultaneously sampled and stored in a separate sample and hold register which is part of the converter 13. The analog-to-digital converter 13 then sweeps the set of sample and hold registers and generates a set of digital numbers as a function of the voltages recorded therein. These digital values are then transferred to the input buffer of a fast Fourier transform generator 14. Every $m(\Delta t)$ seconds the fast Fourier transform generator 14 calculates the discrete Fourier transforms of the last m number of observations for each digitized data sample. The value of m may be fixed or it may be programmable. The fast Fourier transforms developed in the generator 14 are fed as the input to a matrix accumulation unit which comprises two principal elements; one of the elements is a correlator 15 and the other, an integrator 16.

The correlator 15 receives (m/2) Fourier transform components every $m(\Delta t)$ seconds for each sensor output. At each frequency, variances and covariances are calculated for all sensors and for all possible sensor pairs. These covariances and variances are assembled into matrices C(f) where "f" is frequency, so that there are (m/2) matrices, one for each frequency. These matrices are estimates of the covariance matrices which appear in the probability density functions for the Fourier transform components.

The cross-correlation matrices produced by the correlator 15 are integrated for each frequency component over a determinable period of time in the correlator 16 which produces multiple pluralities of integrated output signals, each plurality representing the signals developed at a particular frequency.

The output of the integrator 16 is transferred as one of the inputs to a bearing response calculator 17. A second input to the bearing response calculator 17 is provided by the output from a stored signal model which has been retained in storage in unit 18. The bearing response calculator 17 performs the function of a comparator, comparing the pluralities of integrated output signals received from the integrator 16 with the plurality of synthesized signals received from the stored signal model 18 and producing output signals of relative strength indicative of the direction of the origin of the received data samples relative to the directional disposition of the sensors which developed such data samples.

The integrated matrices developed in the integrator 16 are transferred to the bearing response calculator 17 every ($\Delta t$) minutes. From the comparison made with the stored signal model output provided by unit 18, estimates of the incident plane wave power are calculated as a function of the angle of its arrival and of its frequency. The calculation is made in accordance with the constrained adaptive beam-forming as expressed by $$[V^V(f)C^{-1}(f)V(f)]^{-1} \tag{9}$$

where V is a common vector composed of time $e^{\sqrt{-1} \, 2\pi T_i}$ and the $T_i$'s are travel times to the $i^{th}$ sensor from an arbitrary surface of equal phase.

The resultant output of the comparator is appropriately displayed as on a cathode ray tube and may take one of several selectable forms. For example, an operator may selectively choose one of several modes of display such as power vs. azimuth and elevation for a selected frequency; or, integrated power vs. azimuth and elevation for a selected frequency band; or, power vs. azimuth and frequency for a selected set of azimuth and frequency bands.

OPERATION

For purposes of explanation and illustration the operation of a data analysis system embodying the present invention will be explained as it may function in a typical sonar system. Accordingly, the sensors such as those illustrated schematically in FIG. 1 at 10, 11, and 12 may be assumed to be a set of hydrophones of any suitable number comprising an appropriate array and located in the ocean in a place where signals from a target are likely or are expected to be found. During the available observation time, the hydrophone array will produce voltage outputs as a function of the acoustic pressures sensed at each hydrophone.

Both noise and signal may be assumed to be independently stationary Gaussian processes. However, the signal in any hydrophone output (itself probabilistic) may be assumed to be linearly related, in a deterministic fashion, to the signal developed in any other hydrophone output. This linear relationship is unknown because the direction from which the signal is coming is unknown. However, any hypothesis about the direction of the signal will specify the linear relationships. They are the time delays, $T_i$, associated with travel time of the (usually planar) signal wavefront from some surface of equal phase to the $i^{th}$ hydrophone.

The function of the data analysis system of the present invention is to receive the hydrophone outputs and process them so as to derive an indication of the direction from which a signal is coming or to indicate that no signal at all is present in the outputs developed by the hydrophones.

For purposes of notation, the output of the $i^{th}$ hydrophone over the observation time T may be designated as $$\gamma_i(t), \; 0 \leq t \leq T \tag{10}$$

Both noise and signal are assumed to be band limited so that the $\gamma$'s have finite Fourier series expansions which may be expressed as $$\gamma_i(t) = \sum_{j=1M}^{M} \xi_i(f_j) e^{\sqrt{-1} \, 2\pi f_j t} \quad (11)$$

In this way the voltage outputs from K number of hydrophones over the observation times can be specified by a set of M vectors x(f) where $$x^T(f) = [\xi_1(f)\xi_2(f) \ldots \xi_K(f)]. \quad (12)$$

It may be assumed that the vectors x(f) are Gaussian and the components at different frequencies are uncorrelated. Within one frequency the distribution of x(f) is specified by $$<x^*(f)x^T(f)> = C(f), \quad (13)$$

where $< >$ denotes an ensemble average.

If no signal is present then $C(f) = \nu(f)Q(f)$, where $\nu(f)$ is the spectral density of the noise in an average hydrophone and is chosen so that the trace of A(f) is K. If no noise were present but a signal from direction $\theta$ were present then $C(f,\theta) = \sigma(f)P(f,\theta)$ where $\sigma(f)$ is the signal power spectral density and is chosen so that $\text{tr}[P(f,\theta)] = K$.

The manner in which $P(f,\theta)$ varies with $\theta$ must now be defined. For each hydrophone, there is a $T_i(\theta)$ which represents the travel time from the surface of equal phase (or from the source) to that particular hydrophone. Since the signals which appear in each hydrophone are assumed to differ only by the time in translation $(\tau_i(\theta) - \tau_j(\theta))$, then $P(f,\theta) = [\exp(\sqrt{-1} \, 2\pi f(\tau_i(\theta) - \tau_j(\theta)))]$ (14)

This can be simplified by defining a vector $v(f,\theta)$ such that $$v^T(f,\theta) = [\exp(\sqrt{-1} \, 2\pi f \tau_1(\theta)) \exp(\sqrt{-1} \, 2\pi f \tau_2(\theta)) \ldots \exp(\sqrt{-1} \, 2\pi f \tau_K(\theta))] \text{ and noting that}$$
$$P(f,\theta) = v(f,\theta)v^H(f,\theta). \quad (15)$$

In a typical situation, then, a signal may be coming from an unknown direction $\theta$, and $$C(f,\theta) = \nu(f)Q(f) + \sigma(f)P(f,\theta). \quad (16)$$

Since the customary Gaussian assumption may be made, this defines the probability distribution of x(f) in terms of the noise statistics described by $\nu(f)$ and Q(f), the signal statistics which are described by $\sigma(f)$, and the true but unknown direction of arrival $\theta$ i.e., $P(f,\theta)$ is at each frequency only a function of $\theta$. It is assumed that a beamformer followed by a square law detector is connected to the outputs of the hydrophone array and that the beamformer points in a known direction $\phi$ which may or may not be equal to $\theta$. The beamformer, as employed in carrying out the concept of the present invention, may be assumed to be of any fixed form, optimal, conventional, null-steering, etc., but not adaptive.

The hydrophone outputs $\gamma_i(t)$ are passed through linear filters and summed. If $\zeta_i(f,\phi)$ denotes the transfer function of the linear filter attached to the $i^{th}$ hydrophone output and $$z^T(f,\phi) = [\zeta_1(f,\phi)\zeta_2(f,\phi) \ldots \zeta_K(f,\phi)], \quad (17)$$

then the output of the summing operation is $$\sum_{j=-M}^{M} z^T(f_j,\phi)x(f_j) e^{\sqrt{-1} \, 2\pi f_j t} \quad (18)$$

When this output is squared and averaged the total output power is, from Parseval's Theorem, $$\sum_{j=-M}^{M} z^H(f_j,\phi)x^*(f_j)x^T(f_j)z(f_j,\phi). \quad (19)$$

Accordingly, if observations were made over many time periods and averaged, the result would be $$\sum_{j=-M}^{M} z^H(f_j,\phi)C(f_j,\phi)z(f_j,\phi), \text{ or} \quad (20)$$

$$\sum_{j=-M}^{M} z^H(f_j,\phi)C(f_j)z(f_j,\phi),$$

depending upon whether signal information is present or not.

It is important to consider the relationship between the signal as it occurs in individual hydrophones or sensors and the signal as it occurs in the beam output. In an individual hydrophone or sensor the signal power will be $$\sum_{j=-M}^{M} \sigma(f_j), \quad (21)$$

and at the beamformer output the signal power will be $$\sum_{j=-M}^{M} \sigma(f_j) z^H(f_j,\phi) P(f_j,\theta) z(f_j,\phi) = \quad (22)$$

$$\sum_{j=-M}^{M} \sigma(f_j) |z^H(f_j,\phi) v(f_j,\theta)|^2$$

In many applications it may be desirable that an artificial constraint be placed upon the beamforming filters so that $$z^H(f_j,\phi)v(f_j,\phi) = 1. \quad (23)$$

For purposes of convenience this type of constraint may be referred to as type 1.

Another useful constraint may be arrived at by consideration of the Eckart filter. The optimum frequency filter for an individual sensor prescribes an inter-frequency weighting of $$\sigma(f)/\nu^2(f). \quad (24)$$

From the beam output therefore the weighting would become $$\frac{\sigma(f) |z^H(f,\phi)v(f,\theta)|^2}{\{\nu(f)z^H(f,\phi)Q(f)z(f,\phi)\}^2} \quad (25)$$

It follows that a convenient constraint for some purposes would be $$\frac{|z^H(f,\phi)v(f,\phi)|^2}{\{z^H(f,\phi)Q(f)z(f,\phi)\}^2} = 1 \tag{26}$$

This would make the Eckart filter for all beams the same as for an individual sensor or hydrophone and may be referred to as a type 2 constraint.

For conventional beamforming the beamforming filters are represented by $$z_c(f,\phi) = v(f,\phi) = v(f,\phi). \tag{27}$$

These conditions do not, however, satisfy either type 1 or type 2 constraints although an easy modification could be made to satisfy the type 1 constraint.

For optimum likelihood ratio beamforming, the beamforming filters are $$z_o(f,\phi) = Q^{-1}(f)v(f,\phi). \tag{28}$$

This satisfies the type 2 constraint, but not the type 1 constraint.

When a signal appears, the spectral signal-to-noise ratio at the beamformer output is $$\frac{\sigma(f)}{\nu(f)} \frac{|z^H(f,\phi)v(f,\theta)|^2}{z^H(f,\phi)Q(f)z(f,\phi)} \tag{29}$$

When $\theta = \phi$ the array gain $\mu$ of the system is $$\mu(f,\phi) = \frac{|z^H(f,\phi)v(f,\phi)|^2}{z^H(f,\phi)Q(f)z(f,\phi)} \tag{30}$$

Accordingly, the array gain $\mu$ is unchanged by any scalar multiplier on $z(f,\phi)$. Therefore, $z(f,\phi)$ can be rescaled to fit the type 1 or type 2 constraints without degradation of the beamformer.

It has been noted that generating $z_0(f,\phi)$ requires knowledge of $Q(f)$. It should be noted that $$(\nu(f)Q(f) + \sigma(f)P(f,\theta))^{-1} = (\nu(f)Q(f) + \tag{31}$$

$$\sigma(f)v(f,\theta)v^H(f,\theta))^{-1} = (1/\nu(f))Q^{-1}(f) -$$

$$\lambda Q^{-1}(f)v(f,\theta)v^H(f,\theta)Q^{-1}(f), \text{ where } \lambda =$$

$$(\sigma(f)/\nu^2(f))/\{1 + (\sigma(f)/\nu(f))(v^H(f,\theta)Q^{-1}(f)v(f,\theta))\}$$

Accordingly, if a signal is present when a measure of $Q(f)$ is made, the filters generated are $$z(f,\phi) = (\nu(f) + \tag{32}$$

$$\sigma(f))\left\{\frac{1}{\nu(f)} Q^{-1}(f) - \lambda Q^{-1}(f)v(f,\theta)v^H(f,\theta)Q^{-1}(f)\right\}$$

$$v(f,\phi) = (\nu(f) +$$

$$\sigma(f))\left\{\frac{1}{\nu(f)} z_0(f,\phi) - \lambda(v^H(f,\theta)z_0(f,\phi))z_0(f,\theta)\right\}$$

The null-steering technique of Dr. V. C. Anderson may be regarded as an exploitation of this relationship.

It is most important, however, to consider the consequences when $\phi = \theta$. Then $$z(f,\phi) = (\nu(f) + \tag{33}$$

$$\sigma(f))\left\{\frac{1}{\nu(f)} - \lambda v^H(f,\phi)z_0(f,\phi)\right\}z_0(f,\phi) = (\text{scalar})z_0(f,\phi).$$

To evaluate the scaler it should be noted that $v^H(f,\phi)z_0(f,\phi) = \mu_0(f,\phi)$, so $$\lambda v^H(f,\phi)z_0(f,\phi) = \tag{34}$$

$$(1/\nu(f)) \frac{(\sigma(f)/\nu(f))\mu_0(f,\phi)}{1 + (\sigma(f)/\nu(f))\mu_0(f,\phi)} \text{ and } z(f,\phi) =$$

$$\frac{\nu(f) + \sigma(f)}{\nu(f)} \frac{1}{1 + (\sigma(f)/\nu(f))\mu_0(f,\phi)} z_0(f,\phi)$$

The quantity $[\nu(f)/\nu)f]\mu_0(f,\phi)$ may be interpreted as the output spectral signal-to-noise ratio from the beamformer. In the small signal case, therefore, the first term in the above equation for $z(f,\phi)$ may be ignored.

The optimum or minimum risk solution to the beamforming problem for a multi-beam sonar is to form a likelihood ratio beamformer in each direction of interest. This necessarily implies a requirement for a priori knowledge of $Q(f)$. In actual operation of such a multi-sensor sonar array such information is not usually available, however. Moreover, since the noise environment is constantly in a state of change, a measurement of $Q(f)$ at one time is not necessarily valid at a subsequent time. Accordingly, new estimates of $Q(f)$ and new filter generations must be constantly developed, even while attempts are being made at detecting signal information within the received data samples. This type of system, accordingly, is constantly changing and generally called adaptive. Therefore, the term adaptive shall be used to designate a system which attempts to generate optimum or near optimum beamforming filters from the noise or the noise-plus-signal matrix which is present during an actual detection period.

Thus, an adaptive beamformer is confronted with a most complex problem. If no signal is present, the filters formed will be the correct optimum filters; but if, on the other hand, the signal is present, the errors in filter generation will disturb and permutate the proper output signals, interfering with the proper indication of the presence or absence of a signal. Further, the adaptive beamformer does not sense whether the filters are right or not. It therefore becomes evident that because of such difficulties in addition to estimation difficulties, the adaptive beam former is not the optimum beam former and an even more serious problem arises from the fact that an adaptive system is generally non-linear because the addition of signal changes the filters.

It is desirable therefore to define spectral signal-to-noise ratio in terms which are pertinent to an adaptive system. If $$z(f,\phi) = (\nu(f) + \sigma(f))C^{-1}(f,\phi)v(f,\phi) \tag{35}$$

and the filters which an adaptive system generates and uses when a signal is present, the filters generated in the absence of signal will be $$z_0(f,\phi) = \nu(f)C^{-1}(f)v(f,\phi). \tag{36}$$

Accordingly, the effective spectral signal-to-noise ratio will then be $$\left\{ \frac{z^H(f,\phi)C(f,\phi)z(f,\phi) - z_o^H(f,\phi)C(f)z_o(f,\phi)}{z_o^H(f,\phi)C(f)z_o(f,\phi)} \right\} = \quad (37)$$

$$\left\{ \frac{(v(f) + \sigma(f))z^H(f,\phi)v(f,\phi)}{v(f)z_o^H(f,\phi)v(f,\phi)} \right\}^{-1} =$$

$$\left\{ \frac{v(f) + \sigma(f)}{v(f)} \right\}^2 \left( \frac{1}{1 + (\sigma(f)/v(f))\mu_o(f,\phi)} \right)^{-1}$$

If a small signal assumption is made, then $$\{1/(1 + (\sigma(f)/v(f))\mu_o(f,\phi))\} - 1 = \quad (38)$$

$$\frac{-(\sigma(f)/v(f))\mu_o(f,\phi)}{1 + (\sigma(f)/v(f))\mu_o(f,\phi)}$$

It is important to note the minus sign in the above expression because it indicates that when a signal appears, the output signal power from an adaptive processor system of the type described will decrease instead of increase. If it happens that the signal appears suddenly, the output power may increase briefly until the system has time to adapt, but then it will decrease.

If the type 1 constraint is adopted, this problem is immediately resolved. The computing formula which gives such filters is $$z_1(f,\phi) = \frac{C^{-1}(f)v(f,\phi)}{v^H(f,\phi)C^{-1}(f)v(f,\phi)} = \frac{C^{-1}(f,\phi)v(f,\phi)}{v^H(f,\phi)C^{-1}(f,\phi)v(f,\phi)} \quad (39)$$

The question may arise as to what the effect on z will be if the signal comes from a direction $\theta$ such that $\theta$ is not equal to $\phi$. If the small signal assumption is again made and the signal comes from a direction other than a direction where the system is looking, its effect will be insignificant and may be ignored.

If minimum risk is to be achieved in the detection of signal information in the presence of noise it is indicated that many beams should be formed simultaneously, one in each direction of interest and then measure be made or the power generated by the square law detectors receiving the outputs of these beams. For narrow band problems this rationale suggests that the function $\rho(f,\phi)$ be found for many different $\phi$'s, where the nature of $\rho(f,\phi)$ depends upon the type of beamforming filters which are chosen. For conventional time-shift and sum beamforming $z(f,\phi)=v(f,\phi)$, and $\rho_o(f,\phi)=v^H(f,\theta)C(f,\phi)v(f,\phi)$.

For optimum likelihood ratio beamforming $z_o(f,\phi)=Q^{-1}(f)v(f,\phi)$, and $\rho_o(f,\phi)=v^H(f,\phi)Q^{-1}(f)C(f,\theta)Q^{-1}(f)v(f,\phi)$. For the constrained adaptive beamforming we have $$z_a(f,\phi)=C^{-1}(f,\theta)v(f,\phi)/(v^H(f,\phi)C^{-1}(f,\theta)v(f,\phi))$$

and $$\rho_a(f,\phi)=1/v^H(f,\phi)C^{-1}(f,\theta)v(f,\phi). \quad (40)$$

It is desirable that whichever type of beamforming is chosen, $\rho(f,\phi)$ will come to a distinct maximum at or near the direction where $\phi=\theta$ and be generally uniform elsewhere.

Accordingly, the function $\rho_a(f,\phi)$ together with its subsequent extension to broadband problems, assumes importance and usefulness in dealing with the problem of not knowing C(f).

It may be reasonably assumed that during the available observation time, the outputs of all hydrophones are recorded, including relative phase information. During this time, beamforming filters may be chosen for many different directions, either from the data adaptively or from a priori information. Then the data may be played back through the filters and power outputs corresponding to each direction observed. For those directions which produce outputs of interest, more beamforming filters may be formed for finer directional resolution and the data may be played again through them. This process may be repeated as many times as desired to enhance resolution. This is what is accomplished by the use of $\rho(f,\phi)$. Instead of recording over the entire time period, the matrices C(f,$\theta$) need only be accumulated. Then for each new $\phi$, the computation of $\rho(f,\phi)$ is equivalent to playing back the data through filters for that $\phi$ direction.

A most important point is that whether a signal is present or not, i.e., whether C(f) or C(f,$\theta$) is used, $z_a(f,\phi)$ will always be a scalar multiple of $z_o(f,\phi)$. Since a scalar multiplier does not affect the spatial characteristics of the filters, $z_a(f,\phi)$ will give the maximum possible noise suppression in each direction while retaining a unity response to the signal, i.e., $\rho_a(f,\phi)$ is a measure of signal strength as seen through the quietest possible beamformer. A most important aspect of the present invention is the discovery that it is possible to generate the quietest possible beamforming filters, subject to the constraint of unit signal responses, from C(f,$\theta$) and this led to the development and exploitation of $\rho_a(f,\phi)$. It should be noted that the Q($\phi$,C) expression used hereinbefore is equivalent to the $\rho_a(f,\phi)$ as presently used.

Figure 2A:
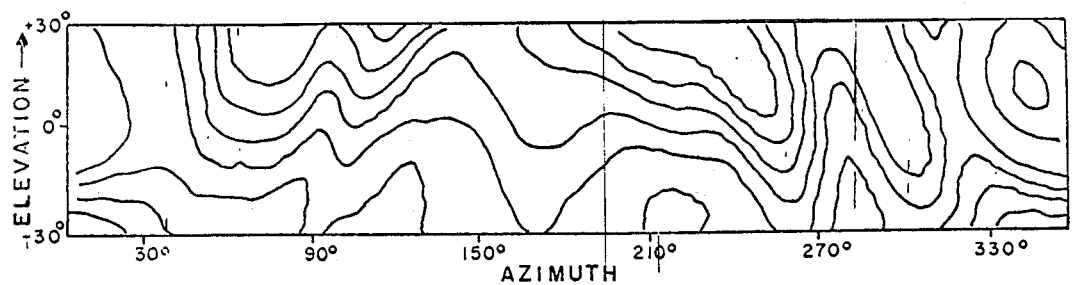
FIGS. 2a and 2b are graphical representations of the displays produced by a conventional data analysis system and the system of the present invention, respectively, in the absence of a target signal.
Figure 2B:
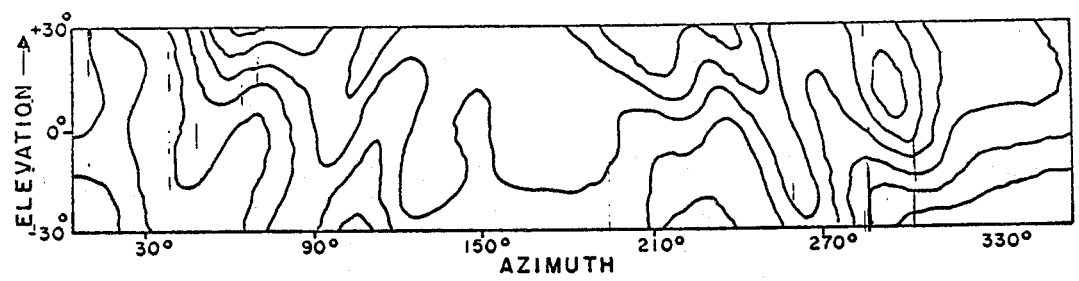
Figure 3A:
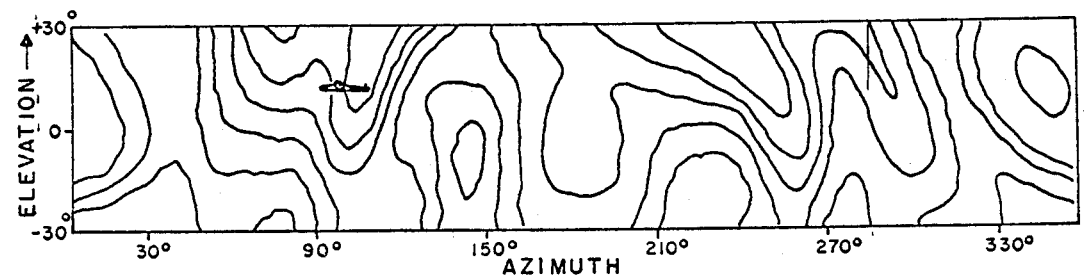
FIGS. 3a and 3b are graphical representations of the displays produced by a conventional data analysis system and the system of the present invention, respectively, in the presence of a target signal.
Figure 3B:
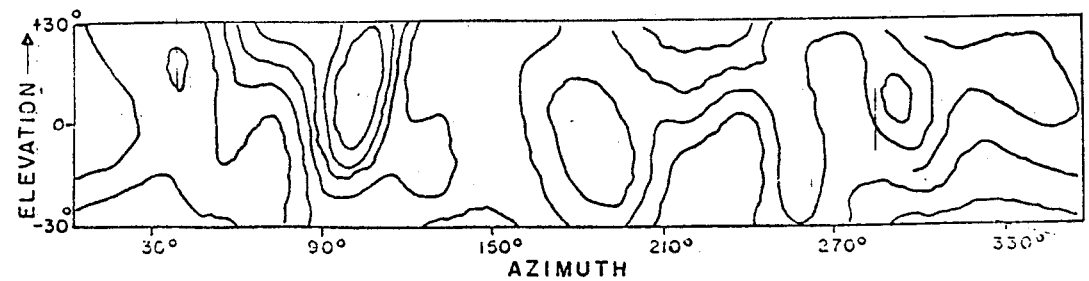

To illustrate these operative relationships, actual data outputs from the present invention are illustrated in FIGS. 2a and 2b and in FIGS. 3a and 3b. FIGS. 2b and 3b represent visual presentation which would be produced by equipment embodying the present invention and for purposes of comparison, FIGS. 2a and 3a represent the visual presentations developed by conventional prior art equipment. The data samples were developed by twelve BQS-6 hydrophones on an SSN. During the recording for FIGS. 2a and 2b, the SSN was running alone at twenty-two knots at a depth of 400 feet.

With the data samples developed in the absence of a known target, the conventional system developed the visual presentation as illustrated graphically in FIG. 2a. Under precisely the same data sample input, the equipment embodying the present invention developed the visual presentation as indicated graphically in FIG. 2b. The figures show contour plots of $\rho$ vs. azimuth and elevation and the contours are separated by one-half dB steps. The high point indicating maximum $\rho$ and target information is marked with a dot and all contours are related to that point. The frequency selected was 1125 cps because at that frequency the signal strength was fairly weak and therefore a better test of the effectiveness of the equipment for purposes of comparison between the conventional prior art system and the system embodying the present invention.

FIGS. 3a and 3b are graphical illustrations of the visual display produced by the conventional prior art system and the system embodying the present invention, respectively, in the detection of a known target. The data samples accumulated and processed to develop the visual displays of FIGS. 3a and 3b were produced by a second SSN running a course parallel to the first SSN at the same speed of 22 knots and 500 yards abeam and 150 feet above the first SSN. Thus, while the $\rho$ from the data accumulated during the visual display developed and shown in FIGS. 2a and 2b does not show any well defined peaks or target information, the data samples developed and processed to produce FIGS. 3a and 3b should desirably indicate a peak at an azimuth of approximately 105° and at an approximate elevation of 5° to 10°.

As is shown in FIG. 3a, the conventional prior art data analysis system has developed what may appear to be significant target information at several points, including approximately 105° azimuth, but the elevation is rather obscure and not clearly indicated. By comparison, however, the equipment embodying the present invention which developed the visual indication graphically illustrated in FIG. 3b shows a distinct target peak at approximately 105° azimuth, and approximately 5° to 10° elevation. The peaking of the signal output indicative of the presence of target information is considerably more distinct in the graphic illustration of FIG. 3b than that of FIG. 3a which was developed from the identical data samples.

Thus, the desirable improvement of the present invention is illustrated by these figures in that the graphical illustrations of FIGS. 2a and 2b indicate that in the absence of significant target information the visual display as between the conventional prior art system and the equipment embodying the present invention is not significantly different. However, in the presence of a target, the system of the present invention produces demonstrably better, more reliable and definite target indication as contrasted to the prior art conventional system.

FIGS. 2a and 2b and FIGS. 3a and 3b illustrate detection within a narrow frequency band. However, in many applications there is a requirement to detect a signal which is too weak to be reliably detected within a narrow frequency band, even with $\rho_o(f,\phi)$. One approach to such problems is to generate a $\rho(f,\phi)$ at each frequency and then combine all of them into one broadband function $\rho(\phi)$. To do this, however, decisions must be made as to which $\rho(f,\phi)$ should be used and how the different $\rho(f,\phi)$'s should be combined.

It is well known that the optimum beamformer combines the beam outputs as prescribed by the Eckart filter. This is facilitated by the fact that $z_o(f,\phi)$ satisfies a type 2 constraint and $$\frac{\gamma(f)}{\nu^2(f)}$$

is independent of direction. This yields $$\rho_o(\phi) = \sum_{i=-M}^{M} (\sigma(f)/\nu^2(f))\rho_o(f_i,\phi) \qquad (41)$$

$$= \sum_{i=-M}^{M} (\sigma(f)/\nu^2(f))v^H(f_i,\phi)Q^{-1}(f)C(f_i,\theta)Q^{-1}(f)v(f_i,\phi)$$

It is also readily demonstrable how this will work out for conventional beamforming. The power is summed over all frequencies giving $$\rho_c(\phi) = \sum_{i=-M}^{M} \rho_c(f_i,\phi) = \sum_{i=-M}^{M} v^H(f_i,\phi)C(f_i,\theta)v(f_i,\phi). \qquad (42)$$

Neither of these solutions is what is ultimately sought, however, because in the first case a priori information is lacking, and in the second case possible improvements in the results are highly questionable. The most desirable solution, however, may be obtained from a form $$\rho(\phi) = \sum_{i=-M}^{M} \psi(f_i,\phi)z^H(f_i,\phi)C(f_i,\theta)z(f_i,\phi) \qquad (43)$$

The problem is to choose $z$ and $\psi$. It is the choice of $\psi(f_i,\phi)$ which causes difficulties. There is no apparent reason to believe that $\psi(f,\phi)$ should not vary with $\phi$, but if it does, then it changes the nature of $\rho(f,\phi)$. Thus the choices of $\psi(f,\phi)$ and $\rho(f,\phi)$ are inextricably linked and, additionally, the nature of the variation with "f" must be established.

By adopting the Eckart approach which is designed to make the signal as easy to detect as possible in the midst of random fluctuations in noise power, the filters may be subjected to a type 2 constraint to ascertain what effect this may have on the contours of $\rho(f,\phi)$.

Firstly, the filters $z(f,\phi)$ will be established; then $z'(f,\phi)$ is developed so that it is equal to $\alpha(f,\phi)z(f,\phi)$ where $\alpha(f,\phi)$ is a scalar chosen so that $z'(f,\phi)$ satisfies a type 2 constraint. To ascertain the results of using $z(f,\phi)$ it should be recalled that the indicated Eckart frequency weighting is $$\rho(\phi) = \sum_{i=-M}^{M} \psi(f_i,\phi)\rho(f_i,\phi) =$$

$$\sum_{i=-M}^{M} \psi(f_i,\phi)z^H(f_i,\phi)C(f_i,\theta)z(f_i,\phi).$$

$$= \frac{\sigma(f)}{\nu^2(f)} \frac{1}{\alpha^2(f,\phi)} \frac{|z^H(f,\phi)v(f,\phi)|^2}{(z^H(f,\phi)Q(f)z(f,\phi))^2}$$

Since this must equal $\sigma(f)/\nu^2(f)$, $$\alpha(f,\phi) = \frac{z^H(f,\phi)v(f,\phi)}{z^H(f,\phi)Q(f)z(f,\phi)} = \frac{\mu'(f,\phi)}{z^H(f,\phi)v(f,\phi)} \qquad (44)$$

When the filters $z'(f,\phi)$ are applied, $$z'^H(f,\phi)C(f,\theta)z'(f,\phi) = \qquad (45)$$

$$\frac{\mu'^2(f,\phi)}{|z^H(f,\phi)v(f,\phi)|^2} z^H(f,\phi)C(f,\theta)z(f,\phi) =$$

$$\mu'(f,\phi)(\nu(f) + \sigma(f)) \simeq \mu'(f,\phi)\nu(f)$$

Here again a small signal assumption has been made.

It is important to note the difference between $\mu'(f,\phi)$ and $\mu(f,\phi)$. $\mu(f,\phi)$ is the actual array gain of the beamformer, while $\mu(f,\phi)$ is the array gain which would be realized if both the noise and the possible signal contained in the data samples were considered as interference and it was desired to detect some signal which might be added to whatever signal may already have been there.

But this function will decrease, not increase, in the region of the signal; thus, a decrease in the contour plot must be detected. With this in mind $$\rho(\phi) = \sum_{i=-M}^{M} (\sigma(f)/\nu(f))\mu'(f,\phi). \quad (46)$$

can be employed.

The best results, however, are still obtained by adaptive beamforming so that $$\rho_a(\phi) = \sum_{i=-M}^{M} (\sigma(f)/\nu(f))\nu^H(f,\phi)Q^{-1}(f,\theta)\nu(f,\phi). \quad (47)$$

If, however, conventional beamforming is used but the best post-summation frequency filtering is desired, then it would be desirable to employ $$\rho_c'(\phi) = \sum_{i=-M}^{M} (\sigma(f)/\nu(f))(1/\nu^H(f,\phi)Q(f,\theta)\nu(f,\phi)) \quad (48)$$

Figure 4A:
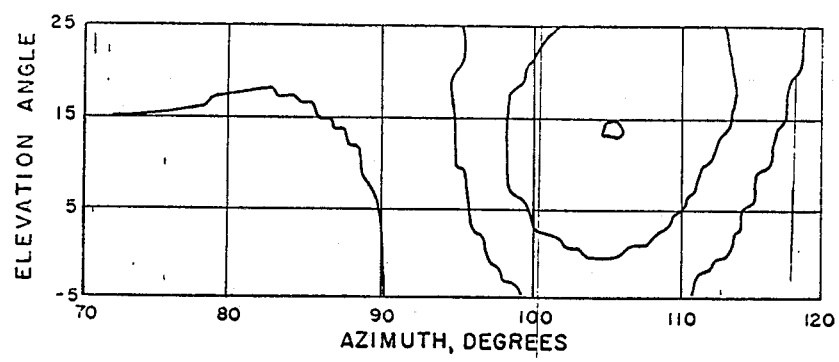
FIGS. 4a and 4b are graphic illustrations of actual visual displays developed from identical data samples employing a conventional data analysis system and the system of the present invention, respectively, for a selected frequency band.
Figure 4B:
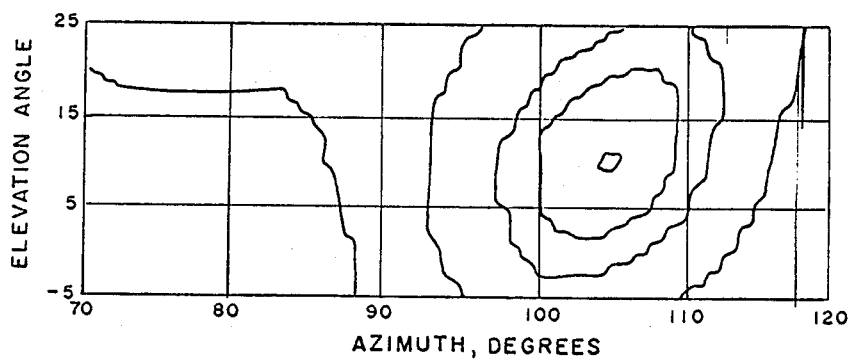

The effectiveness of this concept is illustrated in FIGS. 4a and 4b. The data from which the graphical illustrations of FIGS. 4a and 4b were developed is the same as the noise plus target data used for FIGS. 3a and 3b. However, a frequency band from one kcps to two kcps was employed. The visual display developed as illustrated in FIG. 4a was arrived at by conventional prior art processing. The visual display graphically illustrated in FIG. 4b, however, was developed by employing adaptive pre-summation beamforming followed by adaptive post-summation frequency filtering in accordance with the concept and the teaching of the present invention.

Adaptive beamforming, as applied to a multi-beam system, presents two major problem areas:

1. The adaptive selection of beamforming filters for good results at each frequency; and
2. Adaptive selection of inter-frequency and interdirectional weighting for the different beams.

For (1), the single frequency problem, the conventional solution has been employed in the prior art. The adaptive solution and the optimal solution, however, are new concepts and teachings of the present invention. They are based on generating the quietest possible filters, subject to a constraint of unity gain for the signal, and then measuring the signal strength through them. For (2), the proper selection of inter-frequency or post-summation filters interacts with the beamforming, and averaging the array gain over frequency gives the most definitive and reliable directional indications.

Figure 5A:
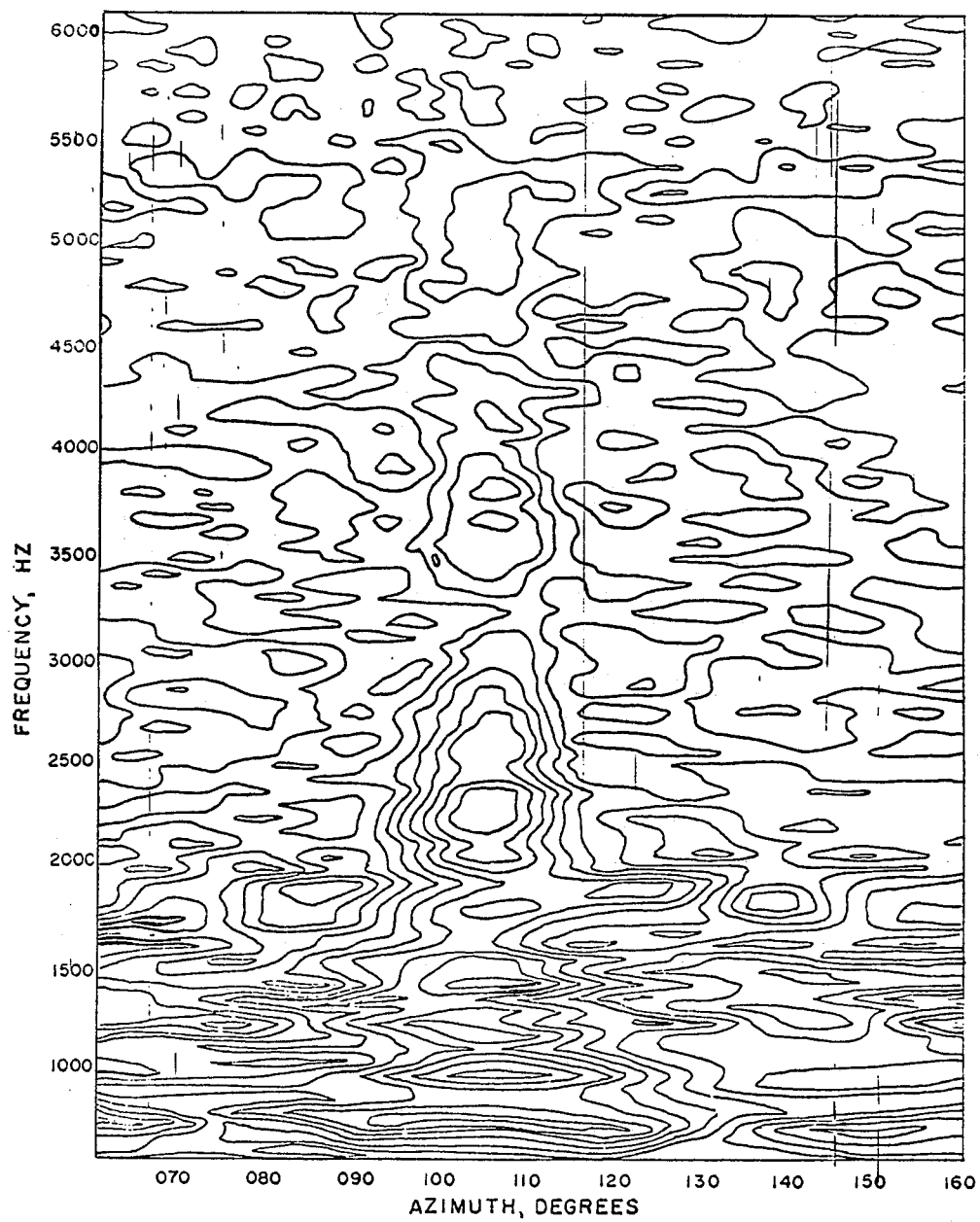
FIGS. 5a and 5b are graphic illustrations of the visual displays developed from identical data samples employing conventional data analysis system and the system of the present invention conventionally as developed for different frequencies.
Figure 5B:
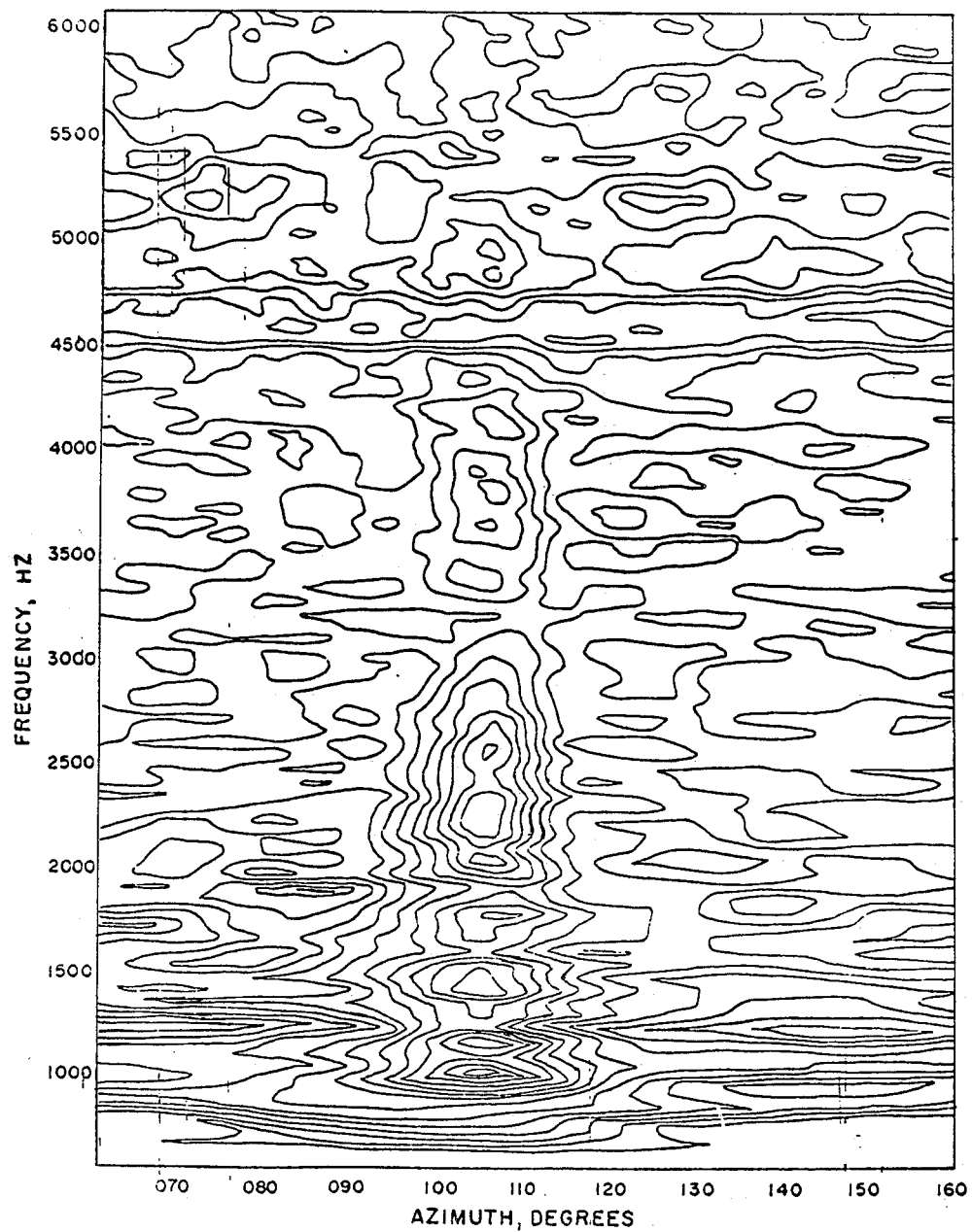

The concept and teaching of the present invention may also be employed to develop yet another type of visual display as illustrated in FIGS. 5a and 5b. These graphical illustrations show power vs. azimuth and frequency for a selected set of azimuths and of frequency bands. The same data samples as were employed to produce the visual indications of FIGS. 3a and 3b, 4a and 4b, were the source of input signals operated upon and processed in accordance with the concept of the present invention to produce the visual indications as illustrated in FIGS. 5a and 5b. It will be noted that in FIG. 5a, which employed conventional equipment, a visual illustration was produced in which the location of the target is relatively obscure at frequencies below 2,000 cps and somewhat more clearly defined at frequencies between 2,000 and 4,000 cps. By contrast, however, the same data samples processed and operated upon in accordance with the concept and teachings of the present invention, as explained hereinbefore, indicate significantly more definitive target indication at frequencies from 1,000 cps through approximately 5,000 cps, thus illustrating the superiority of the significantly improved target indication and detection produced by the use of the invention.

Obviously many modifications and variations of the present invention are possible in the light of the above teachings. It is therefore to be understood that within the scope of the appended claims the invention may be practiced otherwise than as specifically described.

What is claimed is:

1. A data analysis system comprising:
   multiple sensors for generating a series of time related data samples from an environment including sets of common wavefronts;
   means for converting said data samples from analog-to-digital form;
   means for developing the Fourier transforms relative to the frequency components of the data samples in digital form;
   means for cross-correlating each frequency component of the Fourier transforms corresponding to each data sample with each like frequency component of the Fourier transform of each other data sample for developing matrices of all such possible correlations for each frequency component;
   means for integrating the cross-correlation matrices of each frequency component over a determinable time period for producing multiple pluralities of integrated output signals, each plurality representing the signals developed at a particular frequency;
   means for storing multiple pluralities of synthesized signals, each plurality being representative of incident plane wave power as a function of its angles of arrival at a plurality of sensors and of its frequency; and
   comparator means for comparing said pluralities of integrated output signals with said pluralities of synthesized signals for producing output signals of relative strength indicative of the direction of the origin of said data samples relative to the directional disposition of said sensors.

2. A data analysis system as claimed in claim 1 and including means for developing the fast Fourier transforms relative to the frequency components of the data samples in digital form.

3. A data analysis system as claimed in claim 1 and including means for selecting output signals of said comparator means representative of comparisons made of desired frequency components.

4. A data analysis system as claimed in claim 1 and including means for visually displaying said comparator means output signals as a function of the direction of the origin of said data samples relative to the directional disposition of said sensors.

5. A data analysis system as claimed in claim 4 wherein said means for visually displaying said comparator output signals comprises a representation of the power of said data samples vs. azimuth and elevation relative to the directional disposition of said sensors and for a selected frequency.

6. A data analysis system as claimed in claim 4 wherein said means for visually displaying said comparator output signals comprises a representation of integrated power of said data samples vs. azimuth and elevation relative to the directional disposition of said sensors and for a selected frequency band.

7. A data analysis system as claimed in claim 4 wherein said means for visually displaying said comparator output signals comprises a representation of the power of said data samples vs. azimuth and frequency for a selected set of azimuths and frequency bands.

8. A data analysis system comprising:
multiple sensors for generating a series of time related data samples from an environment including sets of common wavefronts;
means for converting said data samples from analog to digital form;
means for developing the Fourier transforms relative to the frequency components of the data samples in digital form;
means for cross-correlating each frequency component of the Fourier transform corresponding to each data sample with each like frequency component of the Fourier transform of each other data sample for developing matrices, $C(f)$, where f is frequency;
means for integrating the matrices, $C(f)$, for each frequency over a determinable time period for producing multiple pluralities of integrated output signals, each plurality representing $C(f)$ of a particular frequency; and
means receiving said integrated output signals for calculating incident plane wave power at said sensors as a function of the angle of arrival and its frequency in accordance with the parameters $[V^H(f)C^{-1}(f)V(f)]^{-1}$, where V is a column vector composed of time, $e^{-1\ 2\pi f t_i}$, and the $T_i$'s are the travel times from a surface of equal phase to each of said sensors.

9. A method of analyzing time related data samples developed from an environment including sets of common wavefronts comprising the steps of:
converting the data samples from analog to digital form;
developing the Fourier transforms relative to the frequency components of the digital data samples;
cross-correlating the frequency components of the Fourier transform for developing matrices for all possible correlations for each frequency component;
integrating the matrices for each frequency component over a determinable time period; and
comparing the integrated matrices with synthesized signals representative of incident plane wave power as a function of its angles of arrival at a sensor array and of its frequency for producing output signals of relative strength indicative of the direction of the origin of the data samples.

* * * * *